US012685950B2

(12) United States Patent
Lin et al.

(10) Patent No.: US 12,685,950 B2
(45) Date of Patent: Jul. 21, 2026

(54) CHARGED PARTICLE FILTER AND REMOVAL SYSTEM

(71) Applicant: Taiwan Semiconductor Manufacturing Co., Ltd., Hsinchu (TW)

(72) Inventors: En Tian Lin, Hsinchu (TW); Chiao Ling Weng, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 373 days.

(21) Appl. No.: 17/839,343

(22) Filed: Jun. 13, 2022

(65) Prior Publication Data

US 2023/0398475 A1    Dec. 14, 2023

(51) Int. Cl.
| | |
|---|---|
| *B01D 35/06* | (2006.01) |
| *B01D 29/00* | (2006.01) |
| *B01D 29/66* | (2006.01) |
| *B01D 35/30* | (2006.01) |
| *C02F 1/469* | (2023.01) |

(52) U.S. Cl.
CPC ............. *B01D 35/06* (2013.01); *B01D 29/66* (2013.01); *B01D 35/30* (2013.01); *C02F 1/469* (2013.01); *B01D 2201/30* (2013.01); *B01D 2201/58* (2013.01); *B01D 2221/14* (2013.01)

(58) Field of Classification Search
CPC ........... B01D 2201/30; B01D 2201/58; B01D 2221/14; B01D 29/66; B01D 35/06; B01D 35/30; C02F 1/469
See application file for complete search history.

(56) References Cited

U.S. PATENT DOCUMENTS

| | | | | |
|---|---|---|---|---|
| 4,382,866 A * | 5/1983 | Johnson | ................. | B01D 35/06 210/243 |
| 4,941,962 A * | 7/1990 | Inoue | ................... | B01D 53/323 204/671 |
| 2004/0251214 A1* | 12/2004 | Adams | ................... | B01D 35/06 210/402 |
| 2013/0189592 A1* | 7/2013 | Roumi | ................ | H01M 8/0247 429/405 |
| 2018/0193779 A1* | 7/2018 | Fritze | .................... | C02F 1/4691 |

FOREIGN PATENT DOCUMENTS

| | | |
|---|---|---|
| TW | I695436 B | 6/2020 |

* cited by examiner

*Primary Examiner* — Dirk R Bass
(74) *Attorney, Agent, or Firm* — Seed IP Law Group

(57) ABSTRACT

The present disclosure is directed to at least one embodiment of a filter that is configured to remove contaminants utilizing a first conductive mesh (e.g., first electrode) and a second conductive mesh (e.g., second electrode) that extends around the first conductive mesh. For example, the first conductive mesh may receive a first electrical signal and the second conductive mesh may receive a second electrical signal such that the first and second conductive meshes are oppositely charged from each other (e.g., the first conductive mesh is positively charged and the second conductive mesh is negatively charged). Anions that are present within the fluid or generated by an electrical field between the first and second conductive meshes may interact with the contaminants such that the contaminants are attracted to at least one of the first and second conductive meshes, respectively.

20 Claims, 9 Drawing Sheets

CHARGED PARTICLE FILTER AND REMOVAL SYSTEM

BACKGROUND

Generally, in the manufacture of semiconductor devices or packages within a semiconductor manufacturing plant (FAB), various fluids are stored and utilized for refining and processing workpieces (e.g., wafers, substrates, etc.) within a semiconductor fabrication plant (FAB). A system for transporting the various fluids to various workpiece processing tools within the FAB may include pipes that the fluid may pass through to reach the workpiece processing tools. For example, the pipes may extend from a storage tank, which stores the fluid, to the workpiece processing tools. The pipes are configured to transport the fluid from the storage tank to the workpiece processing tools. For example, the fluid is transported along these pipes and is received by the workpiece processing tools, and the workpiece processing tools utilize the fluid in some fashion to refine or process respective workpieces at the workpiece processing tools to manufacture semiconductor devices or packages.

Filters may be present along these pipes to filter the fluid as the fluid travels from the storage tank to the workpiece processing tools. For example, these filters are utilized to filter the fluid to remove contaminants (e.g., charged particles, charged particulates, conductive particles, conductive particulates, etc.) present within the fluid. These filters trap and capture these contaminants as the fluid moves along the pipes to the workpiece processing tools, respectively. Once the filters reach an end of their usable lifespan, the filters may be replaced or regenerated.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
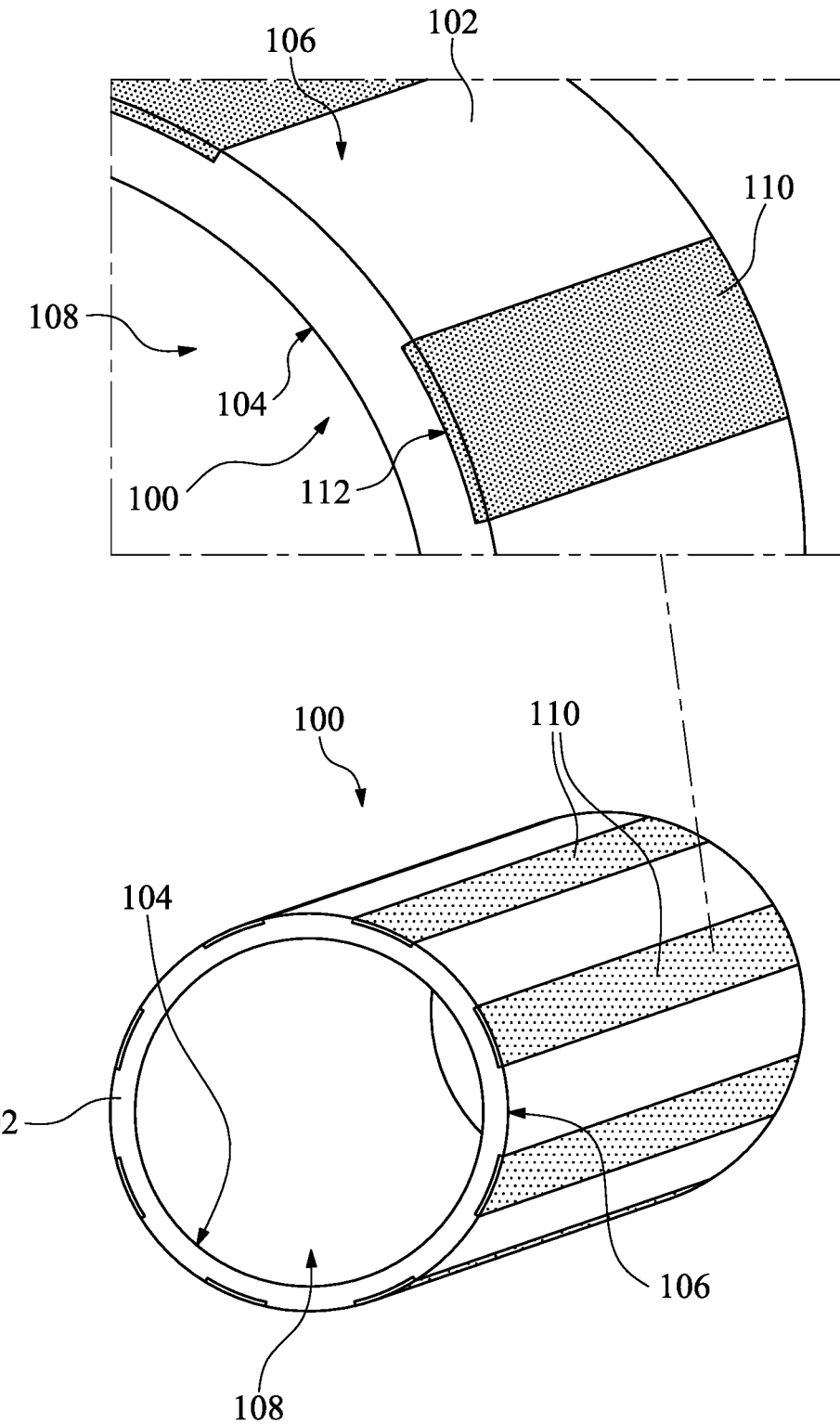
FIG. 1A is a perspective view of an example of a pipe that may be utilized within a semiconductor manufacturing facility (FAB) to transport fluids within the FAB.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Generally, contaminants may be present within a fluid that may be utilized by a semiconductor manufacturing plant (FAB) to manufacture semiconductor devices or packages by refining workpieces within one or more workpiece processing tools within the FAB. To transport this fluid, which may contain charged particles or conductive particles, the FAB may include one or more pipes along which the fluid travels to and from various locations and destinations within the FAB. For example, in at least one situation, the fluid may travel through one or more fluid pathways from a reservoir that contains the fluid to a filter such that the filter may readily remove contaminants from the fluid before being exposed to one or more workpieces that are to be refined within the FAB utilizing the fluid to manufacture semiconductor devices or packages. These contaminants within the fluid may include charged particles or conductive particles (e.g., metal particles or other types of electrically conductive particles) that may damage the one or more pipes as the fluid that contains the charged particles or the conductive particles passes through the one or more pipes. For example, these charged particles or conductive particles may result in crack propagation within the one or more pipes resulting in the fluid being readily able to leak out of the one or more pipes through cracks that are present within the one or more pipes due to this crack propagation.

In view of the above discussion, at least some of the present disclosure is directed to devices, systems, and method for removing charge particles or conductive particles from a fluid that may readily pass through one or more pipes within a FAB to reduce the likelihood of crack propagation within the one or more pipes, in accordance with some embodiments of the present disclosure. For example, at least one device in accordance with some embodiments is a filter that is structured and configured to filter out charged particles or conductive particles from a fluid, at least one system in accordance with some embodiments is a system utilizing the filter to remove charged particle or conductive particles from the fluid within the FAB, and at least one method in accordance with some embodiment is a method for filtering charged particles or conductive particles from a fluid that passes through a filter, in accordance with some embodiments of the present disclosure.

FIG. 1A is a perspective view of an example of a pipe 100 that may be utilized within a semiconductor manufacturing facility (FAB) to transport fluids within the FAB. The pipe 100 includes a first portion 102, which may be referred to as a cylindrical portion of the pipe 100. The first portion 102 may be made of a fluoropolymner material such as a prefluoroalkoxy material, or may be made of some other similar or like type of tough, flexible polymer material or fluorine-base polymer material that is resistant to corrosion or erosion when exposed to chemicals or fluids that readily pass through the pipe 100. The first portion 102 includes an internal surface 104 and an external surface 106 that is opposite to the internal surface 104. A fluid pathway 108 of the pipe 100 is enclosed and defined by the internal surface 104. The pipe 100 further includes a plurality of second portions 110 that are at the external surface 106 of the first portion 102. The plurality of second portions 110 may be made of a conductive material such as a carbon-based conductive material.

In some embodiments, the plurality of second portions 110 are made of the conductive material (e.g., the carbon-based conductive material) as electrostatic discharge can damage fluid handling components in OEM (Original Equipment Manufacturer) systems, leading to leakage or potentially hazardous conditions. However, providing the plurality of second portions 110, which are made of the conductive material, along with the first portion 102, which is made of fluoropolymer material (e.g., the prefluoroalkoxy material), the plurality of second portions 110 minimize potential issues related to electrostatic discharge in wet etch and clean (WEC) tools and bulk solvent distribution within a semiconductor manufacturing facility (FAB). For example, charge accumulation may develop within the pipe 100 as a fluid is traveling through the fluid pathway 108 in the pipe 100 between various locations within a FAB. This charge accumulation that develops accumulates at the external surface 106 of the pipe 100 within the plurality of second portions 110, which are made of the conductive material, due to the traveling of the fluid through the fluid pathway 108 of the pipe 100. This charge accumulation at the external surface 106 within the plurality of second portions 100 may be dissipated due to the plurality of second portions 110 being grounded. For example, the plurality of second portions 110 may be grounded by physically contacting the plurality of second portions 100 with a ground strap (e.g., a conductive strap) that is coupled to an electrical ground. By grounding the plurality of second portions 100 to dissipate charge accumulation within the pipe 100, a purity or a quality of the fluid traveling through the fluid pathway 108 of the pipe 100 may be maintained ensuring safety and improving process yields output by the FAB.

The first portion 102 and the plurality of second portions 110 may be formed by co-extruding the first portion 102 along with the plurality of second portions 110 to form the plurality of second portions 110 within the first portion 102. For example, as shown in a zoomed in view of one of the plurality of second portions 110, each one of the plurality of second portions 110 extends partially into the first portion 102 of the pipe 100. Each one of the plurality of second portions 110 includes an end 112 at which each one of the plurality of second portions 110 terminates within the first portion 102 of the pipe 100.

Figure 1B:
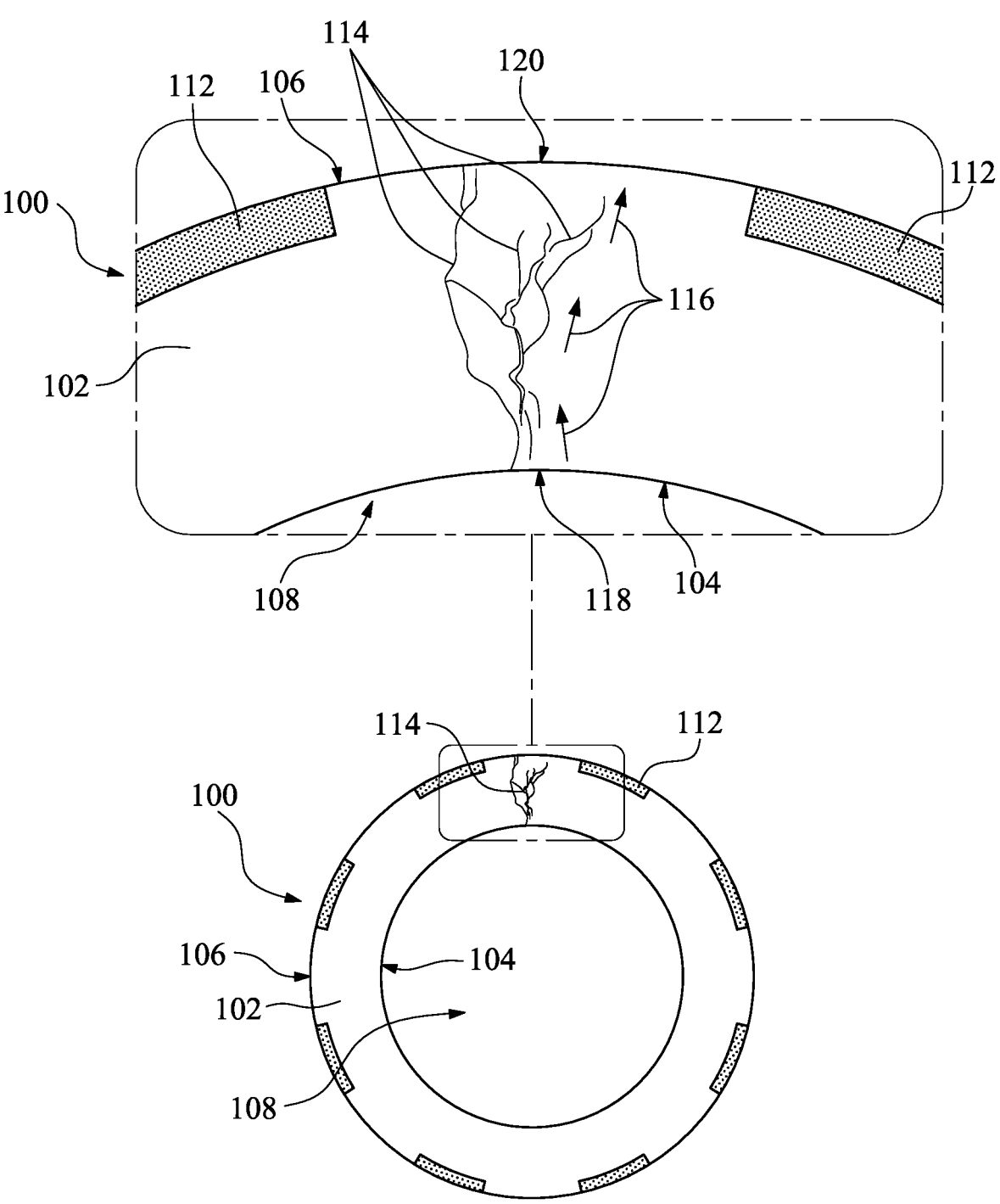
FIG. 1B is a detailed view of an example of a type of failure that may occur in the pipe as shown in FIG. 1A.

FIG. 1B a detailed view of an example of a type of failure that may occur in the pipe 100 as shown in FIG. 1A over prolonged use to transport fluids to various locations within a FAB utilizing the pipe 100. Although the plurality of second portions 100 may prolong the usable lifespan of the pipe 100 as compared to a pipe that does not include the plurality of second portions 100, over time a plurality of cracks 114 may propagate within the pipe 100 due to damage caused by electrostatic breakdown. This electrostatic breakdown is at least partially due to the fluid passing through the fluid pathway 108 of the pipe 100 containing conductive dissolution (e.g., metal dissolution) and particles that results in electrostatic breakdown within the pipe 100 causing the plurality of cracks 114 to propagate. These conductive dissolution and particles may be electrically charged resulting in the electrostatic breakdown within the pipe causing the plurality of cracks 114. These conductive dissolution and particles may be present within the fluid passing through the fluid pathway 108 due to the fluid being stored in stainless steel containers that are used for high temperature and pressure reactions resulting in these conductive dissolution and particles being introduced into the fluid. The fluid, which contains the conductive dissolution and particles, may then be introduced into the pipe 100 such that the fluid passes through the fluid pathway 108 of the pipe 100.

As shown in FIG. 1B, the plurality of cracks 114 that extend from the internal surface 104 of the pipe 100 to the external surface 106 of the pipe 100 result in a fluid leak pathway through which fluid traveling through the fluid pathway 108 of the pipe 100 may readily pass through the plurality of cracks 114. The fluid may pass through the plurality of cracks 114 in a direction as represented by arrows 116. For example, the fluid may enter the plurality of cracks 114 at a fluid leak inlet 118 of the fluid leak pathway at the internal surface 104 of the pipe 100, travel along the fluid leak pathway through ones of the plurality of cracks 114, and exit the pipe 100 at a fluid leak outlet 120 of the fluid leak pathway at the external surface 106 of the pipe 100. This leaking of the fluid that is traveling through the fluid pathway 108 of the pipe 100 results in increased costs such as material costs and maintenance costs to fix and replace the pipe 100 upon leakage of the fluid through the plurality of cracks 114. This leakage of the fluid through the plurality of cracks 114 may cause other types of damage to other components within the FAB that are sensitive to corrosion or erosion when exposed to the fluid that leaks through the plurality of cracks 114.

Alternatively, contaminants from an external environment external to the external surface 106 of the pipe 100 may enter into the fluid leak outlet 120, pass through the plurality of cracks 114 along the fluid leak pathway in a direction opposite to the direction represented by the arrows 116, and enter the fluid pathway 108 through the fluid leak inlet 118. This exposure of contaminants to the fluid traveling through the fluid pathway 108 may result in a decrease yield output by the FAB due to exposing workpieces (e.g., silicon wafers) being refined and processed by workpiece tools within the FAB being exposed to the contaminants through the fluid.

The present disclosure is directed to a filter 200 that is configured and structured to remove conductive dissolution and particles, which may be electrically charged, from a fluid traveling through a FAB to various locations within the FAB to refine and process one or more workpieces (e.g., silicon wafer) utilizing the FAB. As will become readily apparent in view of the following discussion, the filter 200 further improves a lifespan of the pipe 100 as shown in FIGS. 1A and 1B to at least increase a period of time between replacement of the pipe 100 due to the plurality of cracks 114 propagating within the pipe 100 as shown in FIG. 1B.

Figure 2A:
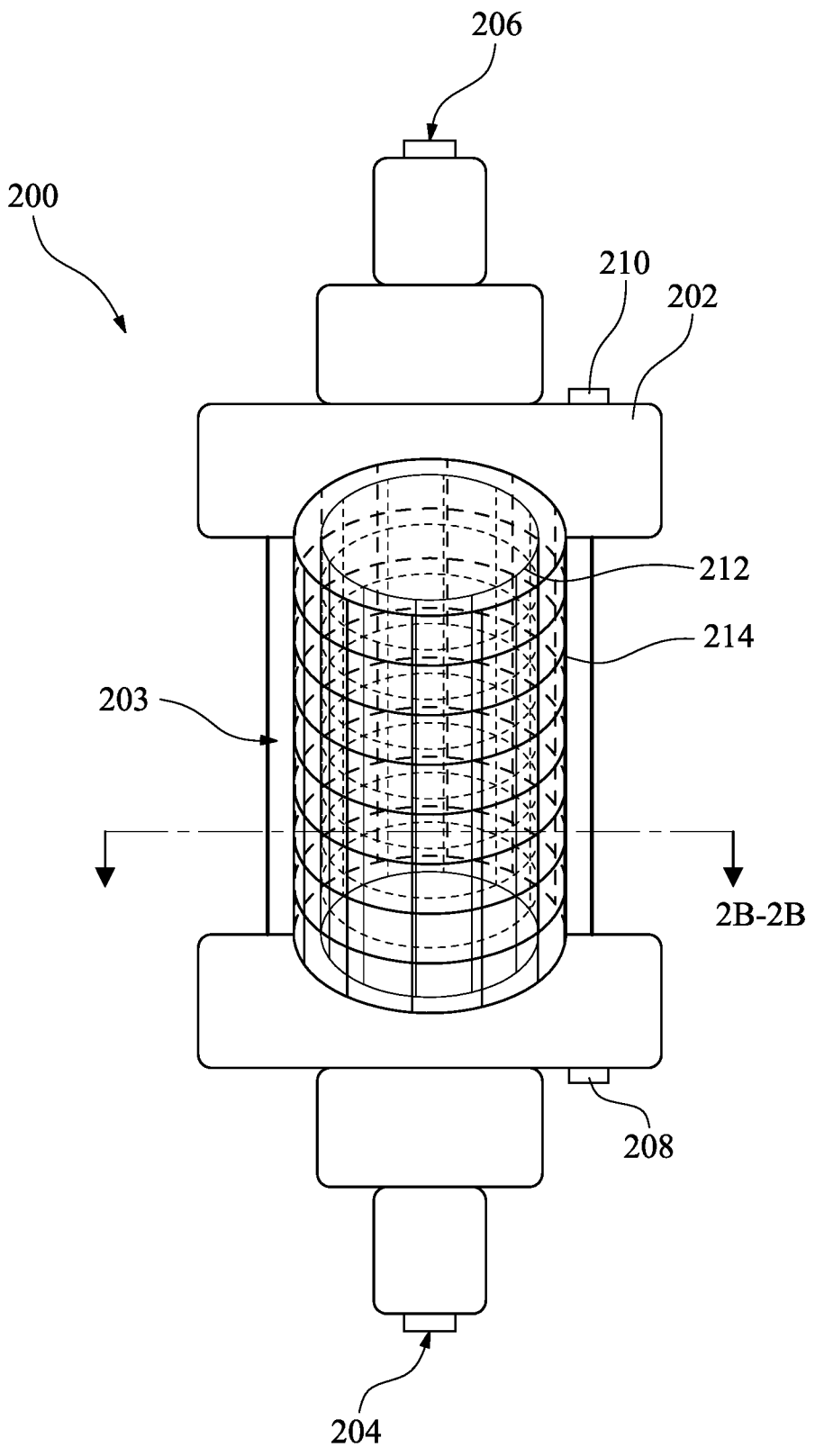
FIG. 2A is a perspective view of an example of a filter, in accordance with some embodiments.

FIG. 2A is a perspective view of an example of the filter 200, in accordance with some embodiments. As shown in FIG. 2A, the filter 200 includes a housing 202 with a first inlet/outlet end 204 and a second inlet/outlet end 206 that is opposite to the first inlet/outlet end 204. In some embodiments, the first inlet/outlet end 204 may function as an inlet for a fluid passing through the filter 200, may function as an outlet for the fluid passing through the filter 200, or may function as both an inlet and outlet depending on a direction of flow of the fluid passing through the filter 200. In some embodiments, the second inlet/outlet end 206 may function as an inlet for a fluid passing through the filter 200, may function as an outlet for the fluid passing through the filter 200, or may function as both an inlet and outlet depending on a direction of flow of the fluid passing through the filter 200. In other words, the first and second inlet/outlet ends 204, 206, respectively, allow the fluid passing through the filter 200 to readily enter and exit the filter 200.

The filter 200 includes a first backwash inlet/outlet 208 and a second backwash inlet/outlet 210. Similar to the first and second fluid inlets/outlets ends 204, 206 as discussed above, the first and second backwash inlets/outlets 208, 210 may function as inlets, outlets, or both depending on a direction of flow of a fluid through the filter 200. In some alternative embodiments, the first and second backwash inlet/outlets 208, 210 may not be present.

A portion of the housing 202 is hidden such that internal components present within a fluid cavity 203 of the housing 202 are readily visible in FIG. 2A. A first conductive mesh 212 is present within the fluid cavity 203 of the housing 202 of the filter 200, and a second conductive mesh 214 is present within the fluid cavity 203 of the housing 202 of the filter 200. The first conductive mesh 212 is surrounded by the second conductive mesh 214. The first and second conductive meshes 212, 214 both have a cylindrical shape such that the first conductive mesh 212 has a first half-diameter D1 that is less than a second half-diameter D2 of the second conductive mesh 214, and the first half-diameter D1 is less than a third half-diameter D3 of the housing 202 (see FIG. 2B of the present disclosure for the first, second, and third diameters D1, D2 AND D3). In other words, the first conductive mesh 212 is spaced inwardly from the second conductive mesh 214. While the first and second conductive meshes 212, 214, respectively, are shown both having the cylindrical shape, in some alternative embodiments, the first and second conductive meshes 212, 214 may have some other different type of shape while at the same time the first conductive mesh 212 is spaced inwardly from the second conductive mesh 214.

The first and second inlet/outlet ends 204, 206 of the filter 200 are in fluid communication with the fluid cavity 203 within the housing 202 in which the first and second conductive meshes 212, 214 are present. The first and second backwash inlets/outlets 208, 210 of the filter 200 are in fluid communication with the filter cavity within the housing in which the first and second conductive meshes 212, 214 are present.

The first and second conductive meshes 212, 214 may include a conductive material such as a metal material that is coated with a protective material. For example, the conductive material may be stainless steel material, and the protective material may be a coated with a fluorine-base polymer such as $C_4F_9OCH_3$. For example, the conductive material of the first and second conductive meshes 212, 214 allows for an electrical current to readily pass through the conductive material of the first and second conductive meshes 212, 214, and the protective material, which may be referred to as a protective coating material, protects the conductive material from being exposed to the fluid to avoid the conductive material corroding or eroding due to exposure to the fluid passing through the filter 200.

Figure 2B:
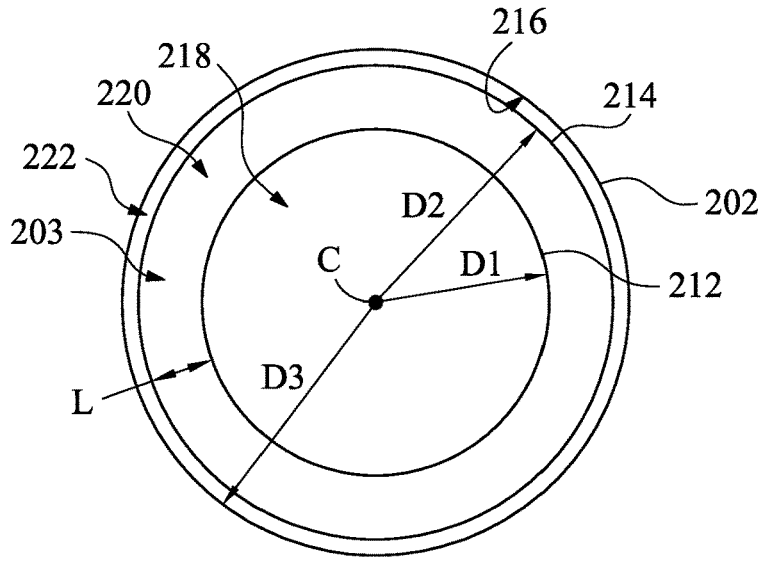
FIG. 2B is a top plan cross-sectional view of the example of the filter as shown in FIG. 2A taken along line 2B-2B as shown in FIG. 2A, in accordance with some embodiments.

FIG. 2B is a top plan view of the example of the filter 200 as shown in FIG. 2A, in accordance with some embodiments. As shown in FIG. 2B, the first conductive mesh 212 is spaced inward from the second conductive mesh 214 by a length L, and the first and second conductive meshes 212, 214 are spaced inwardly from an inner surface 216 of the housing 202 that surrounds the fluid cavity 203 of the housing 202. As discussed earlier, the first conductive mesh 212 has the first diameter D1, the second conductive mesh 214 has the second half-diameter D2, and the housing 202 has the third half-diameter D3. The length L is a difference between the first diameter D1 and the second half-diameter D2. The length L may be substantially equal to 1-centimer, may be less than 1-centimer, may be greater than 1-centimeter, or may be some other length about which the first conductive mesh 212 is spaced inwardly from the second conductive mesh 214. The length L may be selected depending on the types of contaminants that are being filter from a fluid passing through the filter 200, which includes the first conductive mesh 212 and the second conductive mesh 214.

The first conductive mesh 212, the second conductive mesh 214, and the housing 202 are coaxial with each other about a central axis C as shown in FIG. 2B. When the first and second conductive meshes 212, 214 are cylindrical in shape and the housing 202 is cylindrical in shape as well, respective central axes of the first conductive mesh 212, the second conductive mesh 214, and the housing 202 are aligned with the central axis C. For example, the first conductive mesh 212, the second conductive mesh 214, and the housing 202 may be concentric with each other.

The fluid cavity 203 is separated into a first volume 218, a second volume 220, and a third volume 222. The first volume 218 is surrounded by the first conductive mesh 212. The central axis C extends through the first volume 218. The second volume 220 is separated by the first volume 218 by the first conductive mesh 212, and the second volume 220 is between the first conductive mesh 212 and the second conductive mesh 214. The third volume 222 is separated from the second volume 220 by the second conductive mesh 214, and the third volume 222 is between the inner surface 216 of the housing 202 and the second conductive mesh 214. In some alternative embodiments, the third volume 222 may not be present as the second conductive mesh 214 may be directly adjacent to the inner surface 216 of the housing 202 such that the second conductive mesh 214 physically abuts the inner surface 216 of the housing 202. The first volume 218 may be referred to as a central volume, the second volume 220 may be referred to as an intermediate volume that is between the first and third volumes 218, 222, and the third volume 222 may be referred to as a peripheral volume that is spaced outwardly from the first and second volumes 218, 220. A fluid may readily pass through the first, second, and third volumes 218, 220, 222 as the fluid passes through the filter 200.

Figure 2C:
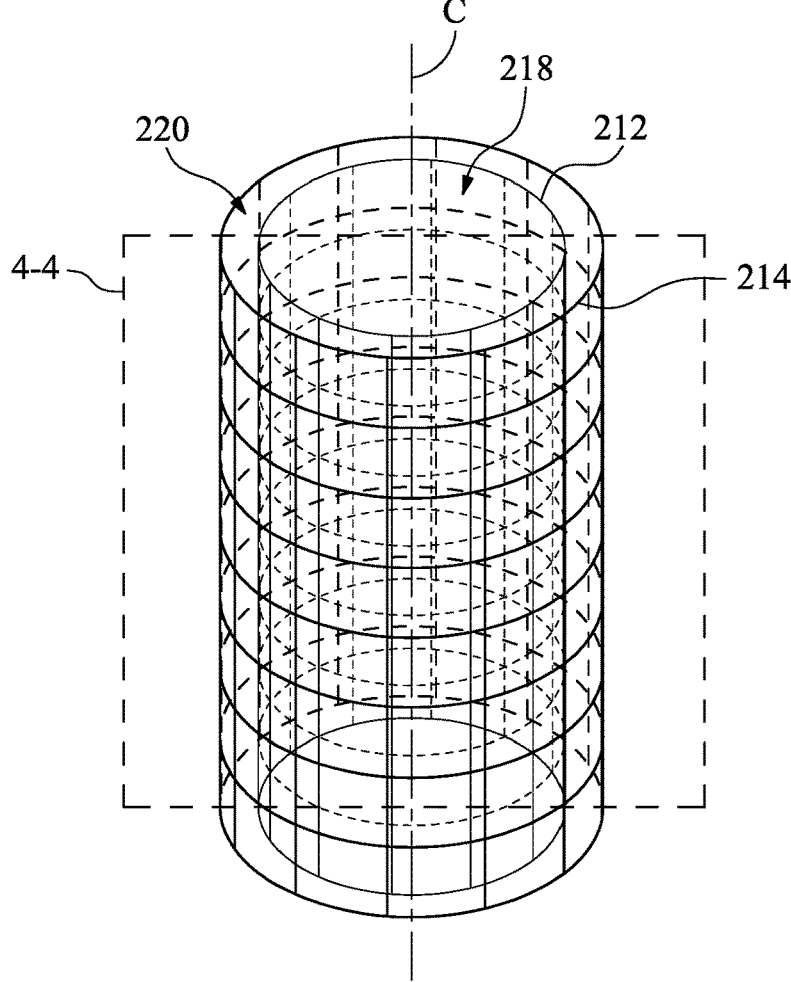
FIG. 2C is a perspective view of the example of the filter as shown in FIG. 2A with a housing of the filter hidden, in accordance with some embodiments.

FIG. 2C is a perspective view of the example of the filter 200 as shown in FIG. 2A with the housing 202 of the filter 200 hidden, in accordance with some embodiments. As shown in FIG. 2C, the first and second conductive meshes 212, 214 are more readily visible in FIG. 2C, and the first and second conductive meshes 212, 214 have the cylinder shape as discussed earlier herein. Details of the functionality of the filter 200 as shown in FIGS. 2A-2C will be discussed in greater detail later herein with respect to FIGS. 3-5 of the present disclosure.

The first and second conductive meshes 212, 214 as shown in FIGS. 2A-2C may have a 2,800 mesh size (3-micrometers), a 2,300 mesh size (5-micrometers), a 2,000 mesh size (8-micrometers), an 1,800 mesh size (10-micrometers), or may have any other mesh size suitable for filtering out conductive dissolution or particles present within a fluid passing through the filter 200. For example, the mesh size of the first and second conductive meshes 212, 214 may be up to a 200-mesh size (74-micrometers) or larger. The mesh size may be selected depending on the types of contaminants that may be present within a fluid that is being filtered by the filter 200, which includes the first and second conductive meshes 212, 214. In some embodiments, the first and second conductive meshes 212, 214 may have mesh sizes that are the same as each other. In some embodiments, the first and second conductive meshes 212, 214 may have mesh sizes different from each other. For example, the first conductive mesh 212 may have a mesh size of 2,800 and the second conductive mesh 214 may have a mesh size of 1,800, the first conductive mesh 212 may have a mesh size of 2,300 and the second conductive mesh 214 may have a mesh size of 2,800, the first conductive mesh 212 may have a mesh size of 1,800 and the second conductive mesh 214 may have a mesh size of 2,000, or the first and second conductive meshes 212, 214 may have some other mesh size such that the first conductive mesh 212 has a mesh size different from the second conductive mesh size 214, respectively.

Figure 3:
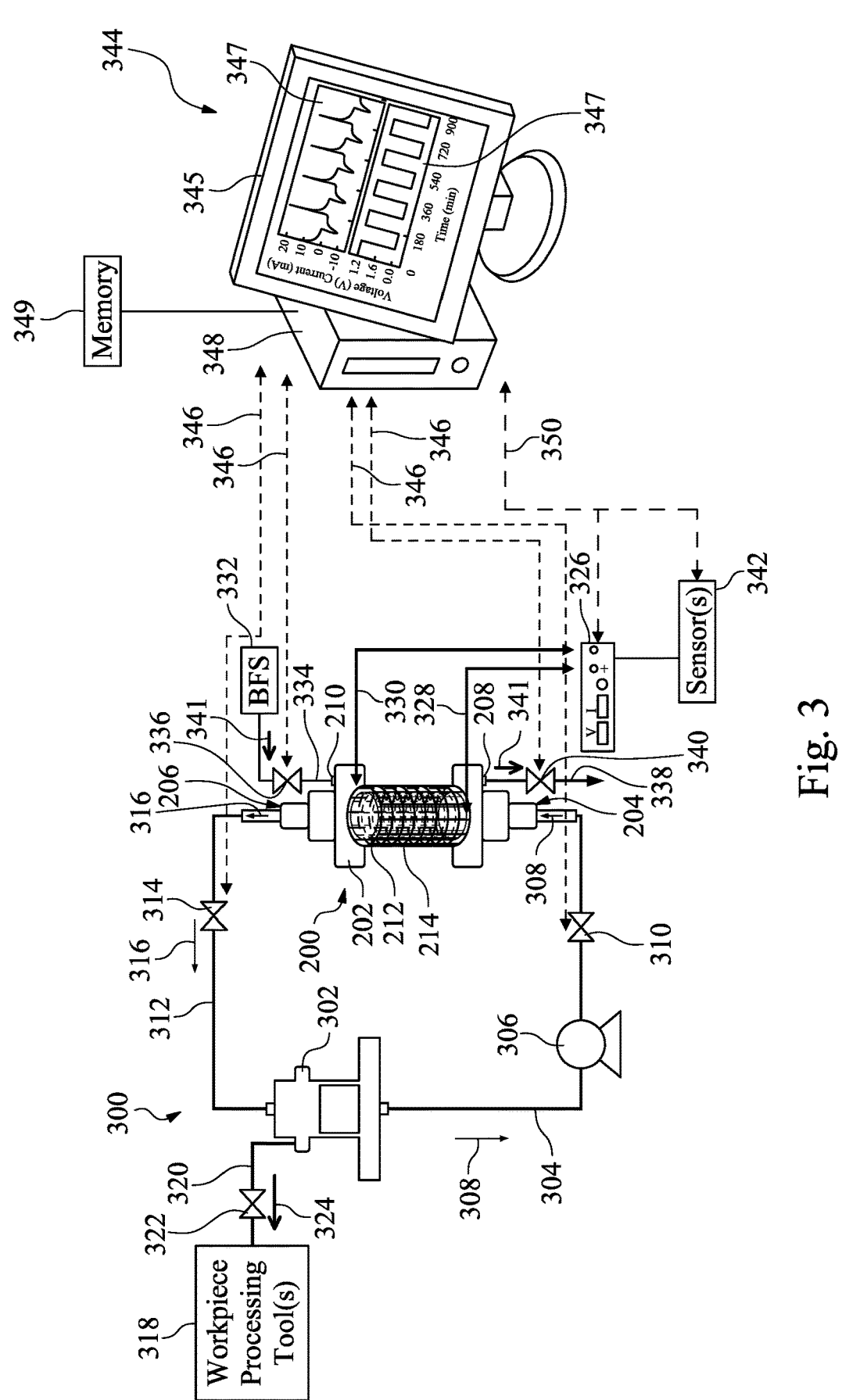
FIG. 3 is a schematic view of an example of a system including the filter as shown in FIGS. 2A-2C, in accordance with some embodiments.

FIG. 3 is a schematic view of an example of a system 300 including the filter 200, in accordance with some embodiment. The system 300 further includes a reservoir tank 302 that contains a fluid, which may be an ultra-pure clean (UPC) water, an isopropyl-alcohol (IPA), or some other suitable type of fluid that may be stored within the reservoir tank 302 to be utilized within a semiconductor manufacturing plant (FAB). The reservoir tank 302 may be referred to as a reservoir container, a storage tank, a storage container, or some other similar or like reference to the reservoir tank 302.

A first fluid pathway 304 extends from the reservoir tank 302 to the first inlet/outlet end 204 of the filter 200 such that the reservoir tank 302 is in fluid communication with the first inlet/outlet end 204 of the filter 200 through the first fluid pathway 304. A pump 306 is present along the first fluid pathway 304 and is downstream the reservoir tank 302. The pump 306 is configured to pump the fluid within the reservoir tank 302 along the first fluid pathway 304 to the filter 200.

A first valve 310 is present along the first fluid pathway 304 and is downstream from the reservoir tank 302 and the pump 306. The first valve 310 may be opened to allow the fluid to travel through the first valve 310 along the first fluid pathway 304 to the filter 200, and the first valve 310 may be closed to prevent, stop, and block the fluid from traveling to the filter 200 through the first fluid pathway 304. In other words, the first valve 310 has an opened position and a closed position. Under normal operation of the system 300, the flow of the fluid being pumped from the reservoir tank 302 by the pump 306 through the first fluid pathway 304 to the filter 200 is represented by arrows 308.

The first inlet/outlet end 204 of the filter 200 is downstream the first valve 310 and is at an end of the first fluid pathway 304 that is opposite to an end of the first fluid pathway 304 at the reservoir tank 302. In other words, the first fluid pathway 304 has a first end at the reservoir tank 302 and a second end at the first inlet/outlet end 204 of the filter 200.

A second fluid pathway 312 extends from the second inlet/outlet end 206 of the filter 200 to the reservoir tank 302 such that the second inlet/outlet end 206 of the filter 200 is in fluid communication with the reservoir tank 302 through the second fluid pathway 312. The second fluid pathway 312 has a first end at the second inlet/outlet end 206 of the filter 200 and a second end at the reservoir tank 302.

A second valve 314 is present along the second fluid pathway 312. The second valve 314 is downstream the second inlet/outlet end 206 of the filter 200. The second valve 314 may be opened to allow the fluid to travel through the second valve 314 along the second fluid pathway 312 from the second inlet/outlet end 206 of the filter 200 to the reservoir tank 302, and the second valve 314 may be closed to prevent, stop, and block the fluid from traveling to the reservoir tank 302 through the second fluid pathway 312. In other words, the second valve 314 has an opened position and a closed position. Under normal operation of the system 300, the flow of the fluid passes through the second fluid pathway 312 from the second inlet/outlet end 206 of the filter 200 to the reservoir tank 302 through the second fluid pathway 312, which is represented by arrows 316.

At least one workpiece processing tool 318 is in fluid communication with the reservoir tank 302 through a third fluid pathway 320, which has a first end at the reservoir tank 302 and a second end at the at least one workpiece processing tool 318. A third valve 322 is present along the third fluid pathway 320. When the third valve 322 is opened, the fluid from the reservoir tank 302 may pass through the third fluid pathway 320 to the at least one workpiece processing tool 318, and, alternatively, when the third valve 322 is closed, the fluid from the reservoir tank may be prevented, blocked, or stopped from traveling through the third fluid pathway 320 to the at least one workpiece processing tool. The flow of the fluid from the reservoir tank 302 to the at least one workpiece processing tool 318 is represented by an arrow 324. The fluid may be provided to the at least one workpiece processing tool 318 to carry out a processing technique or a refinement technique on a workpiece (e.g., a silicon wafer) within the at least one workpiece processing tool 318. For example, at least some processing technique or refinement techniques to be carried out by the at least one workpiece processing tool 318 may be a wet-etching technique, a patterning technique, a chemical-etching technique, or some other similar or like type of processing or refinement technique that may be carried out by the at least one workpiece processing tool 318 on the workpiece.

A power supply 326 of the system 300 is coupled to the first conductive mesh 212 and the second conductive mesh 214. The power supply 326 is coupled to the first conductive mesh 212 by a first line 328 and is coupled to the second conductive mesh 214 by a second line 330. The power supply 326 is configured to supply electrical signals to the first and second conductive mesh 212, 214. For example, the power supply 326 may provide electrical signals to the first and second conductive meshes 212, 214 such that the first and second conductive meshes 212, 214 are both positively charged, are both negatively charged, or are oppositely charged relative to each other (e.g., the first conductive mesh 212 positively charged and the second conductive mesh 214 negatively charged and vice versa).

A backwash fluid source 332 is in fluid communication with the filter 200 through a first backwash fluid pathway 334, which has a first end at the backwash fluid source 332 and a second end at the second backwash inlet/outlet 210 of the filter 200. The backwash fluid source 332 may be a backwash fluid reservoir or storage in which the backwash fluid is stored. The backwash fluid may be an ultrapure clean water (UPC) or some other type of backwash fluid suitable for backwashing the filter 200.

A first backwash valve 336 is present along the first backwash fluid pathway 334 and is downstream the backwash fluid source 332. The first backwash valve 336 may be opened to allow a backwash fluid to travel through the first backwash valve 336 along the first backwash fluid pathway 334 to the filter 200 from the backwash fluid source 332, and the first backwash valve 336 may be closed to prevent, stop, and block the backwash fluid from traveling to the filter 200 through the first backwash fluid pathway 334. In other words, the first backwash valve 336 has an opened position and a closed position. During a backwash operation, the first backwash valve 336 may be opened to allow the backwash fluid to flow into the fluid cavity 203 of the filter 200 through the second backwash inlet/outlet 210.

A second backwash fluid pathway 338 is in fluid communication with the first backwash inlet/outlet 208. The second backwash fluid pathway 338 has a first end at the first backwash inlet/outlet 208 and a second end of the second backwash fluid pathway 338 may be at a disposal location (not shown) at which waste is stored and collected to be disposed.

A second backwash valve 340 is present along the second backwash fluid pathway 338 and is downstream the first backwash inlet/outlet 208 of the filter 200. The second backwash valve may be opened to allow the backwash fluid to pass through the second backwash valve 340 along the second backwash fluid pathway 338 and travel away from the filter 200, and the second backwash valve 340 may be closed to prevent, stop, and block the backwash fluid from traveling through the second backwash fluid pathway 338 away from the filter 200. During the backwash operation, the second backwash valve 340 may be opened to allow the backwash fluid to flow through the second backwash fluid pathway 338 such that the backwash fluid may exit the filter 200 and be disposed of at the disposal location (not shown). During the backwash operation, the flow of the backwash fluid through the first and second backwash fluid pathways 334, 338 is represented by arrows 341.

At least one sensor 342 is coupled to the power supply 326 such that the at least one sensor 342 may monitor characteristics and qualities of the various components of the filter 200. The at least one sensor 342 may be a sensor that monitors fluctuations or changes in a flow of current at or near the first and second conductive meshes 212, 214, respectively, or a flow of the fluid through the filter 200. For example, the at least one sensor 342 may be a current sensor (e.g., an amp multimeter), a voltage sensor (e.g., a voltage multimeter), a particle counter (e.g., contaminant particle counter), a fluid flow sensor, a temperature sensor, or any other suitable sensor or combination of sensors to monitor characteristics and qualities with respect to component of the filter 200 and the flow of fluid through the filter 200. While not shown, in some embodiments, the sensor 342 may be a component of the filter 200. While not shown, in some embodiments, the at least one sensor may be a component of the power supply 326. While not shown, in some embodiments, the at least one sensor 342 may be a separate and distinct component from the filter 200 and from the power supply 326.

A processing system 344, which is a computer as shown in FIG. 3, of the system 300 is in electrical communication with the power supply 326 and the at least one sensor 342. The processing system 344 includes a display 345 and a processor 348. The processing system 344 includes a memory 349 that stores control instructions and parameters for controlling the various components of the system 300, and stores data and information collected and processed by the processing system 344 that may be utilized in controlling the system 300.

Figure 5A:
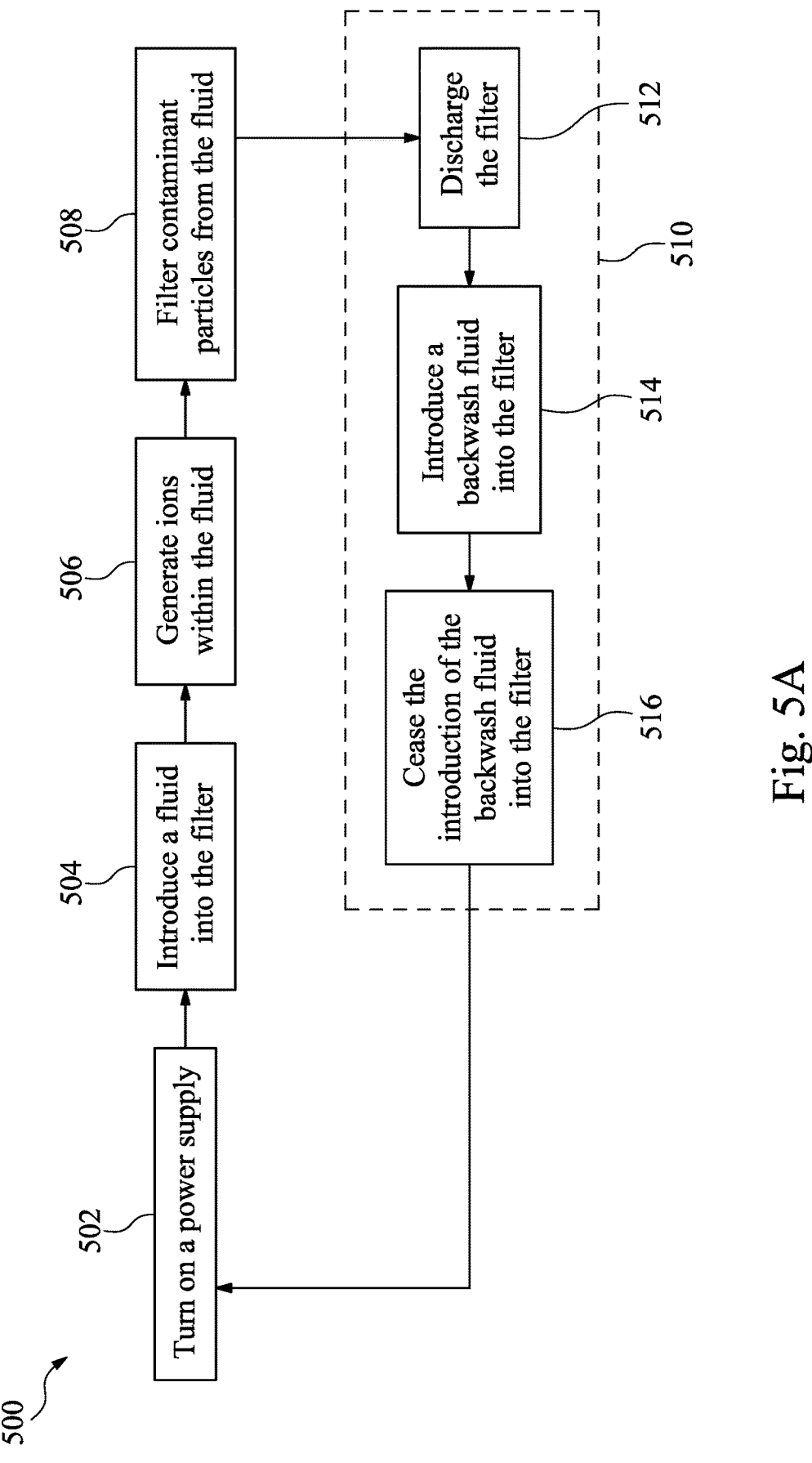
FIG. 5A is a flowchart of a method to filter a fluid passing through the filter as shown in FIGS. 2A-2C, in accordance with some embodiments.
Figure 5B:
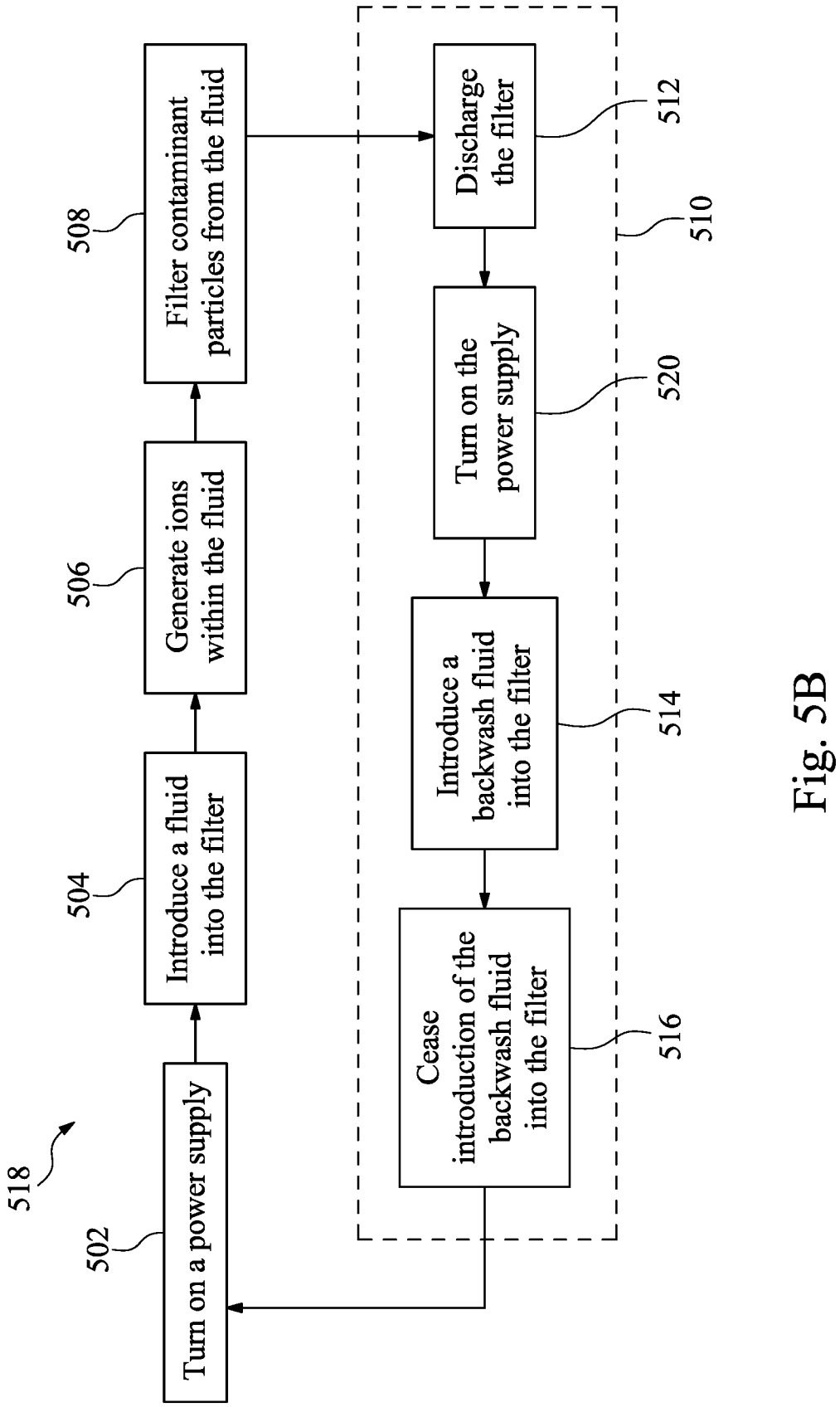
FIG. 5B is a flowchart of a method to filter a fluid passing through the filter as shown in FIGS. 2A-2C, in accordance with some embodiments.

As shown in FIG. 3, the display 345 may be configured to display one or more charts or graphs 347. For example, one of the one or more charts or graphs 347 may be a current versus time trench chart, one of the one or more charts or graphs 347 may be a voltage versus time trend chart, or the one or more charts or graphs 347 may be some other suitable chart or graph to monitor the filter 200 in real time when in use. In some instances, when one of the one or more charts or graphs 347 includes or is a current versus time trend chart, when the current trend goes down to a flat line, a backwash process 510 may be performed as discussed later herein with respect to FIGS. 5A and 5B such that one of the first and second conductive meshes 212, 214 or both may be pole reversed (e.g., switched from a negative charge to a positive charge or vice versa) to when performing the backwash process 510 to remove contaminant particles captured or trapped by either one of the first or second conductive meshes 212, 214 or both. Alternatively, in some instances, when one of the one or more charts or graphs includes or is a voltage versus time chart, respective voltages in either one of the first and second conductive meshes 212, 214 or both may be monitored to determine when to perform the backwash processes 510 as shown in FIGS. 5A and 5B of the present disclosure. Alternatively, in some instances, multiple factors (e.g., both current and voltage) may be monitored to determine when to perform the backwash processes 510 as shown in FIGS. 5A and 5B of the present disclosure The processor 348 of the processing system 344 is in electrical communication with the power supply 326 and the at least one sensor 342 along a first line 350. For example, electrical signals such as data signals may be transmitted by the power supply 326 and the at least one sensor 342 to the processor 348, and electrical signals such as control signals may be transmitted by the processor 348 to the power supply 326 and the at least one sensor 342 to control the power supply 326 and to control the at least one sensor 342. These various electrical signals may be transmitted along the first line 350. In some embodiments, the first line 350 may only couple the power supply 326 to the processor 348 as the power supply 326 may include a memory that is coupled to the at least one sensor 342 and then transmits the data signals with respect to the at least one sensor 342 reading to the processor 348.

The processor 348 of the processing system 344 is in electrical communication with the first valve 310, the second valve 314, the first backwash valve 336, and the second backwash valve 340 by a plurality of second lines 346. Electrical signals, which may be data signals, may be transmitted from electrical components of the first valve 310, the second valve 314, the first backwash valve 336, and the second backwash valve 340 to the processor 348 of the processing system 344, and electrical signals, which may be control signals, may be transmitted from the processor 348 of the processing system 344 to the first valve 310, the second valve 314, the first backwash valve 336, and the second backwash valve 340, respectively. The electrical signals (e.g., the data signals) received by the processor 348 may be stored on the memory 349, and the electrical signals (e.g., the data signals) received by the processor 348 may be processed by the processor 348 and converted into processed data that is then transmitted and stored on the memory or is utilized to control the respective valves 310, 314, 336, 340, the power supply 326, and the sensors 342. For example, raw data and processed data may be stored on the memory 349, and raw data and processed data that is received by the processor 348 may be utilized to control the respective valves 310, 314, 336, 340, the power supply 326, and the sensors 342.

Figure 4:
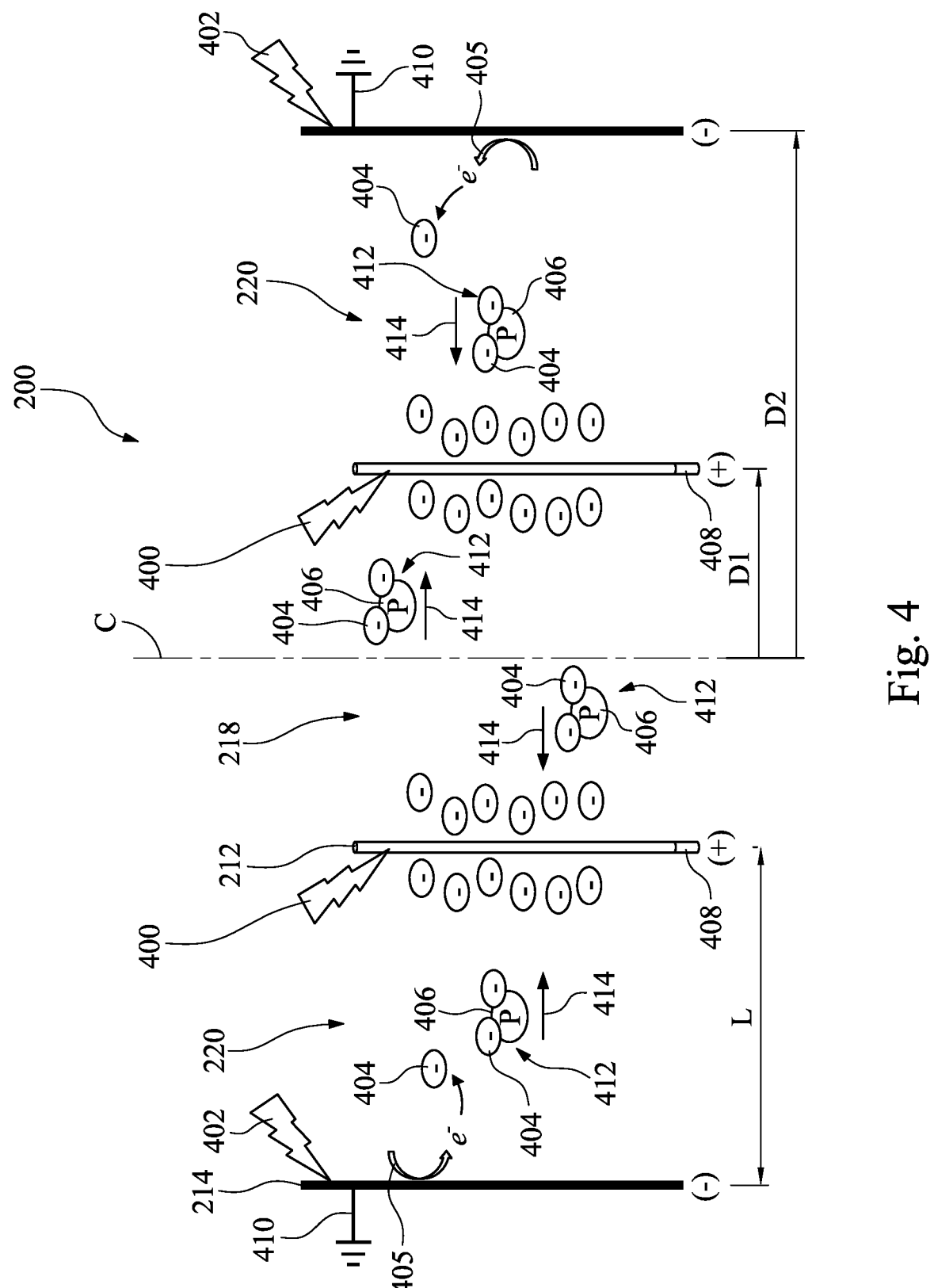
FIG. 4 is a partial cross-sectional schematic view of the example of the filter as shown in FIGS. 2A-2C taken along a plane 4-4 as shown in FIG. 2C, in accordance with some embodiments.

FIG. 4 is a partial cross-sectional schematic view of the example of the filter as shown in FIGS. 2A-2C taken along a plane 4-4 as shown in FIG. 2C, in accordance with some embodiments. As discussed earlier and as shown in FIG. 4, the first conductive mesh 212 is spaced inwardly from the second conductive mesh 214 such that the first conductive mesh 212 is closer to the central axis C than the second conductive mesh 214. While not shown, the housing 202 of the filter 200 extends around and surrounds the first and second conductive meshes 212, 214 such that the first and second conductive meshes 212, 214 are housed within the housing 202.

As shown in FIG. 4, the first conductive mesh 212 receives a first electrical signal 400 (e.g., current and voltage) that results in the first conductive mesh 212 being positively charged. This first electrical signal 400 is transmitted to the first conductive mesh 212 from the power supply 326 through the first line 328 (see FIG. 3 of present disclosure). The second conductive mesh 214 receives a second electrical signal 402 (e.g., current and voltage) that results in the second conductive mesh 214 being negatively charged. The second electrical signal 402 is transmitted to the second conductive mesh 214 from the power supply 326 through the second line 330 (see FIG. 3 of the present disclosure).

In the embodiment as shown in FIG. 4, the first electrical signal 400 is a positive electrical signal and the second electrical signal 402 is a negative electrical signal. The first and second electrical signals 400, 402, respectively, may have the same magnitude but be oppositely charged relative to each other or the first and second electrical signals 400, 402, respectively, may have different magnitude and be oppositely charged relative to each other. In some embodiments, the first electrical signal 400 may instead be a positive charge such that the first conductive mesh 212 is negatively charged and the second electrical signal 402 may instead be positively charged such that the second conductive mesh 214 is positively charged.

A fluid passes through and along the first and second conductive meshes 212, 214, respectively, of the filter 200. The fluid may be water ($H2O$), isopropyl alcohol (IPA), trimethyl ammonium hydroxide (TMAH) or may be some other suitable type of fluid that may be readily utilized within a FAB. The fluid may be utilized in performing one or more refinement or processing techniques on workpieces (e.g., silicon wafers) within a FAB.

The first conductive mesh 212 includes at least one discharge electrode 408 that may be at an end of the first conductive mesh 212 or may be present at a location between opposing ends of the first conductive mesh 212. The second conductive mesh 214 includes at least one discharge electrode 410 that may be at an end of the second conductive mesh 214 or may be present at a location between opposing ends of the second conductive mesh 214. These discharge electrodes 408, 410, respectively, may be utilized to discharge electrical currents or voltages (e.g., the first electrical signal 400 and the second electrical signal 402) from the first and second conductive meshes 212, 214, respectively.

As shown in FIG. 4, ions 404 are present within the fluid, which may have been generated due to the generation of electrons 405 by the second conductive mesh 214, and contaminant particles 406 (e.g., conductive particles such as dissolute conductive particles) are present within the fluid. The ions 404 may be OH ions that are generated due to the fluid being water passing along the first and second conductive meshes 212, 214, respectively, or may be some other type of ion depending on the type of fluid passing through the filter 200 and along the first and second conductive meshes 212, 214, respectively. The contaminant particles 406 may be iron (Fe), aluminum (Al), nickel (Ni), or some other type of contaminant particle that may be present within the fluid. The operation of the first and second conductive meshes 212, 214, respectively, and the filter 200 will be discussed in detail with respect to FIGS. 5A and 5B as follows.

FIG. 5A is a flowchart 500 of a method of utilizing the filter 200 to filter a fluid (e.g., a chemical fluid utilized to process a workpiece such as a substrate, a semiconductor substrate, a wafer, or some other suitable type of workpiece) passing through the filter 200, in accordance with some embodiments. The following discussion of the flowchart 500 of the method utilizing the filter 200 will be discussed in detail in view of the above discussions with respect to FIGS. 2A-2C, 3, 4, and 5 of the present disclosure. The method of the flowchart 500 may be carried out after the filter 200 is installed within a FAB and is brought into electrical communication with the power supply 326.

In a first step 502 of the flowchart 500, the power supply 326 is turned on such that the first electrical signal 400 is supplied to the first conductive mesh 212 and the second electrical signal 402 is supplied to the second conductive mesh 214. The supplying of the first and second electrical signals 400, 402, respectively, to the first and second conductive meshes 212, 214 results in the first and second conductive meshes 212, 214 being oppositely charged relative to each other. For the purposes of the following discussion, the first electrical signal 400 will be a positive electrical signal such that the first conductive mesh 212 is positively charged, and the second electrical signal 402 will be a negative electrical signal such that the second conductive mesh 214 is negatively charged.

After the first step 502 in which the first and second electrical signals 400, 402 are applied to the first and second conductive meshes 212, 214 by turning or powering on the power supply 326, in a second step 504 the first and second valves 310, 314 are opened and the pump 306 is turned or powered on to circulate the fluid from the reservoir tank 302 through the first fluid pathway 304, the filter 200, and the second fluid pathway 312, which may be more readily seen in FIG. 3 of the present disclosure. The circulation of the fluid from the reservoir tank 302 along the first fluid pathway 304, the filter 200, and the second fluid pathway 312 is represented by the arrows 308 as shown in FIG. 3.

After the second step 504 in which the first and second valves 310, 314 are opened and the pump 306 is turned or powered on, in a third step 506 of the flowchart 500 electrons 405 begin to be generated at the second conductive mesh 214 such that the electrons 405 are introduced into the fluid passing along the first and second conductive meshes 212, 214. The third step 506 may occur shortly after the second step 504. As the electrons 405 are introduced into the fluid, the electrons 405 interact with the fluid such that ionization occurs within the fluid generating the ions 404 within the fluid. For example, these ions 404 may be molecules that become negatively charged upon receipt of one or more of the electrons 405 generated by the second conductive mesh 214 or they may be the result of disassociation of molecules of the fluid. For example, water may dissociate into OH⁻ and H⁺ ions. Isopropyl alcohol may dissociate into OH and $(CH_3)_2CH^+$ ions. In this embodiment, the ions 404 are negatively charged such that the ions are anions. These negatively charged ions 404 interact with the contaminant particles 406 such that the ions 404 become associated with the contaminant particles 406, e.g., the ions 404 are attracted to, bound to or attach onto the contaminant particles 406. For example, the negatively charged or biased ions 404 may become associated with the contaminant particles 406, which may have a neutral charge or a positive charge, through Coulomb forces or other forces, such as van der Waal or ionic forces. The association of the negatively charged ions 404 to the contaminant particles 406 results in groups 412 including at least one of the ions 404 and at least one of the contaminant particles 406 being negatively charged or biased.

After the third step 506 in which the ions 404, which are anions, are generated through the introduction of the electrons 405 from the second conductive mesh 214 and are attached to the contaminant particles 406 resulting in the groups 412 being negatively charged or biased, in a fourth step 508 of the flowchart 500 the groups 412 are moved towards and to the first conductive mesh 212 and are moved away from the second conductive mesh 214. The groups 412, which are negatively charged or biased, are attracted to the first conductive mesh 212 as the first conductive mesh 212 is positively charged by the first electrical signal 400. Oppositely, the groups 412, which are negatively charged or biased, are repelled from the second conductive mesh 214 as the second conductive mesh 214 is negatively charged by the second electrical signal 402. Movement of the groups 412 towards the first conductive mesh 212 and away from the second conductive mesh 214 is represented by arrows 414. Once the groups 412 reach the first conductive mesh 212, the groups 412 are trapped within, on, or at the first conductive mesh 212 such that the groups 412 are filtered from the fluid passing through the filter 200 and along the first and second conductive meshes 212, 214, respectively. The groups 412 being trapped within, on, or at the first conductive mesh 212 results in the contaminant particles 406 being removed from the fluid passing through the filter 200 and along the first and second conductive meshes 212, 214, respectively. Removing the contaminant particles 406 from the fluid passing through the filter 200 and along the first and second conductive meshes 212, 214, respectively, reduces the likelihood of manufacturing defective semiconductor devices or packages within a FAB as these contaminants are not introduced to workpieces being processed or refined by the FAB. Reducing the likelihood of manufacturing defective semiconductor devices or packages increases a yield of usable or within tolerance semiconductor devices or packages that are manufactured by the FAB.

Figure 6:
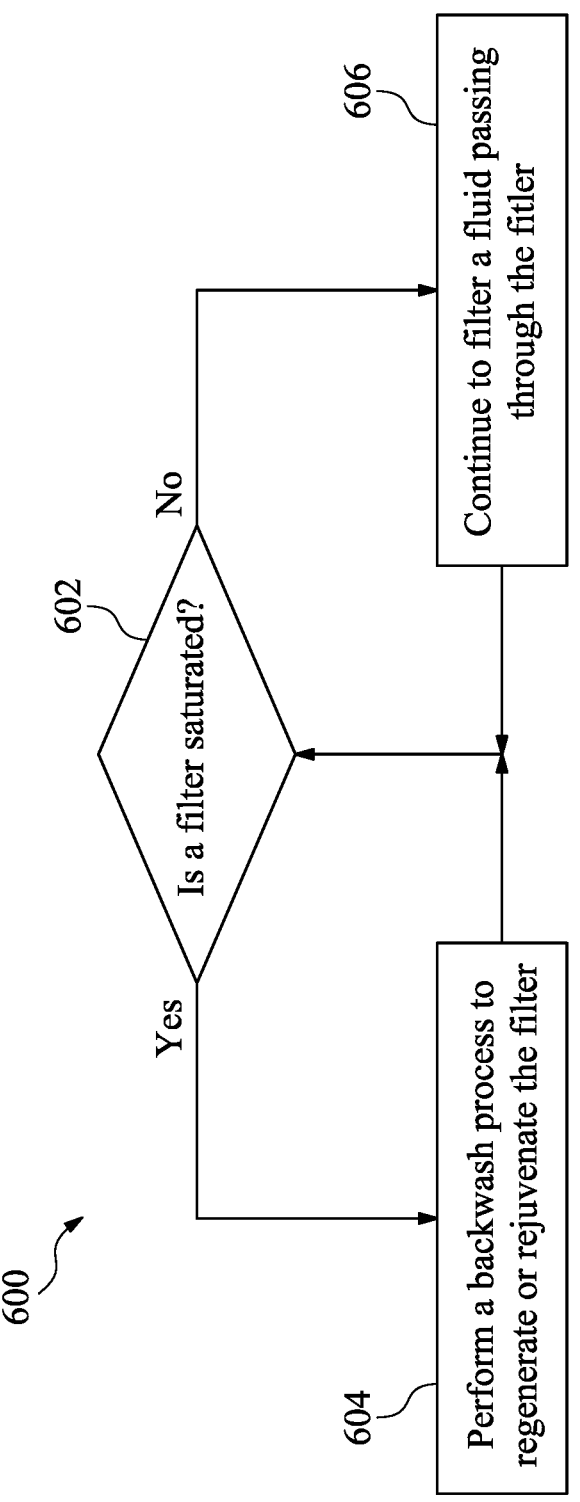
FIG. 6 is a block diagram of a control scheme to control the system as shown in FIG. 3, in accordance with some embodiments.

After the fourth step 508 in which the groups 412 are captured or trapped within, on, or at the first conductive mesh 212 to filter out the contaminant particles 406 within the fluid passing through the filter 200 and along the first and second conductive meshes 212, 214, respectively, a backwash process 510 of the flowchart 500 is performed upon saturation of the first conductive mesh 212. For example, once the first conductive mesh 212 is saturated with the groups 412, which include at least one of the ions 404 and at least one of the contaminant particles 406, the backwash process 510 is performed and carried out. A block diagram 600 for a control scheme to determine when the first conductive mesh 212 is saturated is shown in FIG. 6, and details of determining when the first conductive mesh 212 is saturated will be discussed in further detail with respect to FIG. 6 of the present disclosure later herein. As shown in the flowchart 500 of FIG. 5A, the backwash process 510 includes a fifth step 512, a sixth step 514, and a seventh step 516.

Upon saturation of the first conductive mesh 212 of the filter 200, which may be determined by the control scheme of the block diagram 600 as shown in FIG. 6, the fifth step 512 is performed in which the first and second conductive meshes 212, 214 are discharged utilizing the respective discharge electrodes 408, 410, respectively. For example, a circuit may be closed utilizing the respective discharge electrodes 408, 410 such that the first and second conductive meshes 212, 214 become coupled to a ground and the charges previously present within the first and second conductive meshes 212, 214 are discharged through the ground. Discharging the first and second conductive meshes 212, 214 releases any attraction between the groups 412, which include at least one of the ions 404 and at least one of the contaminant particles 406, and the first conductive mesh 212 such that the groups 412 are no longer trapped within, on, or at the first conductive mesh 212. For example, the groups 412 may begin to move away from the first conductive mesh 212 such that the groups 412 are floating within a more uniform manner within any residual fluid still present within the filter 200.

After the fifth step 512 in which the first and second conductive meshes 212, 214 are discharged utilizing the respective discharge electrodes 408, 410, respectively, in a sixth step 514 a backwash fluid from the backwash fluid source 332 is introduced into the filter 200. Before the backwash fluid from the backwash fluid source 332 is introduced into the filter 200, the pump 306 is turned or powered off, the first valve 310 is closed, and the second valve 314 is closed to stop circulation of the fluid stored in the reservoir tank 302 through the first fluid pathway 304, the filter 200, and the second fluid pathway 312. After the pump 306 is turned or powered off and the first and second valves 310, 314 are closed, the first and second backwash valves 336, 340 are opened such that the backwash fluid from the backwash fluid source 332 passes successively through the first backwash fluid pathway 334, the filter 200, and the second backwash fluid pathway 338. As the backwash fluid from the backwash fluid source 332 enters the filter 200 through the first backwash fluid pathway 334 and passes through the filter 200, the groups 412 are removed from the filter 200 by the flow of the backwash fluid through the filter 200. As the backwash fluid becomes saturated with the groups 412 as passing through the filter 200, the backwash fluid exits the filter 200 through the second backwash fluid pathway 338 removing the groups 412 from the filter 200. As the backwash fluid removes the groups 412 from the filter 200, the filter 200 is rejuvenated such that the filter 200 is no longer saturated with the groups 412. The backwash fluid from the backwash fluid source 332 may be introduced into the filter and allowed to flow through the filter 200 for a selected period of time to optimize rejuvenation of the filter 200.

After the seventh step 516 in which the backwash fluid from the backwash fluid source 332 is introduced into and flows through the filter 200, the method in the flowchart 500 may revert back to the first step 502 to repeat the method of the flowchart 500. The method of the flowchart 500 may be carried out multiple times in succession to continually filter the fluid stored within the reservoir tank 302 such that the fluid within the reservoir tank 302 remains of sufficient quality to be utilized within a FAB for manufacturing semiconductor devices or packages within the FAB.

In view of the above discussion of the method as shown in the flowchart 500 in FIG. 5A, the filtered fluid (e.g., the fluid from which the contaminants were filtered by the filter 200) that exits the filter 200 in the fourth step 508 may then be introduced to a processing chamber of a workpiece tool in which a workpiece (e.g., a substrate, a semiconductor substrate, a wafer, or some other suitable type of workpiece) was previously received. For example, the workpiece may have been inserted into the processing chamber before the fourth step 508 is carried out, before the first step 502 is carried out, or at some other point during the method as shown in the flowchart 500. However, the chemical fluid is filtered by the filter 200 before being introduced to the workpiece within the processing chamber to prevent exposing the workpiece to contaminants. The workpiece tool may be an etching tool, a cleaning tool, or some other suitable type of workpiece tool that processes or refines the workpiece present within the processing chamber of the workpiece tool utilizing the filtered fluid (e.g., filtered chemical).

FIG. 5B is directed to a flowchart 518 of a method of utilizing the filter 200 to filter a fluid (e.g., a chemical fluid utilized to process a workpiece such as a substrate, a semiconductor substrate, a wafer, or some other suitable type of workpiece) passing through the filter 200, in accordance with some embodiments. The following discussion of the flowchart 518 of the method utilizing the filter 200 has several of the same or similar features and steps as the method in the flowchart 500 as shown in FIG. 5A. Accordingly, for the sake of simplicity and brevity of the present disclosure, only differences between the method of the flowchart 518 relative to the method of the flowchart 500 will be discussed in further detail herein.

Unlike the method of the flowchart 500 as shown in FIG. 5A, the method in the flowchart 518 as shown in FIG. 6 includes an additional step 520. In the step 520, the power supply 326 is turned on again such that at least the first conductive mesh 212 receives an electrical signal that results in the first conductive mesh 212 being negatively charged such that the groups 412, which are negatively charged or biased, are repelled from the first conductive mesh 212 such that the groups 412 move away from the first conductive mesh 212. By applying this electrical signal to negatively charge the first conductive mesh 212, the backwash process 510 may be more effective in optimizing the rejuvenation of the filter 200 by removing more of the groups 412 from the first conductive mesh 212 before repeating the method of the flowchart 518. In some embodiments, the power supply 326 may be turned or powered off during or before the sixth step 514 is carried out or completed.

In some alternative embodiments, both the first and second conductive meshes 212, 214 may receive respective electrical signals from the power supply 326 in the step 520 such that the first conductive mesh 212 and the second conductive mesh 214 is oppositely charged. Charging the first and second conductive meshes 212, 214 oppositely when performing the third and fourth steps 506, 508, respectively, may further improve removing the groups 412 from the first conductive mesh 212 to further optimize the rejuvenation of the filter 200. For example, the groups 412 at an outer surface of the first conductive mesh 212 may be repelled from the outer surface of the first conductive mesh 212 and may be attracted to an inner surface of the second conductive mesh 214, which may result in a greater number of the groups 412 being removed from the first conductive mesh 212. When both the first and second conductive meshes 212, 214 are charged in this fashion, the respective electrical signals applied to the first and second conductive meshes 212, 214 may be pulsed to prevent the groups 412 being trapped within, on or at the second conductive mesh 214. In some embodiments, the power supply 326 may be turned or powered off during or before the sixth step 514 is carried out or completed.

In view of the above discussion of the method as shown in the flowchart 518 in FIG. 5B, the filtered fluid (e.g., the fluid from which the contaminants were filtered by the filter 200) that exits the filter 200 in the fourth step 508 may then be introduced to a processing chamber of a workpiece tool in which a workpiece (e.g., a substrate, a semiconductor substrate, a wafer, or some other suitable type of workpiece) was previously received. For example, the workpiece may have been inserted into the processing chamber before the fourth step 508 is carried out, before the first step 502 is carried out, or at some other point during the method as shown in the flowchart 500. However, the chemical fluid is filtered by the filter 200 before being introduced to the workpiece within the processing chamber to prevent exposing the workpiece to contaminants. The workpiece tool may be an etching tool, a cleaning tool, or some other suitable type of workpiece tool that processes or refines the workpiece present within the processing chamber of the workpiece tool utilizing the filtered fluid (e.g., filtered chemical).

While the above methods in the flowcharts 500, 518 as shown in FIGS. 5A and 5B are directed to the generation of the ions 404, which are anions, by applying the first and second electrical signals 400, 402, respectively, to the first and second conductive meshes 212, 214, respectively, it will be readily appreciated that in some alternative embodiments the first and second electrical signals 400, 402 may be adapted to strip electrons from the contaminant particles 406 such that the contaminant particles being positively biased are attracted to the negatively charged one of the first and second conductive meshes 212, 214. In other words, the contaminant particles 406 are stripped of electrons such that the contaminant particles 406 become cations that are attracted to the negatively charged one of the first and second conductive meshes 212, 214, respectively.

With respect to the methods as shown in the flowcharts 500, 518 and the control scheme in the block diagram 600, the filter 200 may be replaced within the system 300 once the filter 200 has reached the end of its usable lifespan. For example, the filter 200 may be determined to be at the end of its usable lifespan if a period of time between the performance of successive backwash processes 510 is below a selected period of time. Alternatively, one or more sensors may be present within the system 300 to monitor the filtration efficiency of the filter 200, and, when the one or more sensors to determine that the filter 200 is no longer efficiently filtering the contaminant particles 406 from the fluid, the filter 200 may be replaced with a new filter, which is the same or similar to the filter 200. For example, the one or more sensors may include a first particle counter, an influent conductivity sensor, or some other type of sensor at or adjacent to the first inlet/outlet end 204 of the filter 200 and a second particle counter, an effluent conductivity sensor, or some other type of sensor at or adjacent to the second inlet/outlet end 206 of the filter 200. These one or more sensors may be in electrical communication with the processor 348 of the processing system 344.

FIG. 6 is the block diagram 600 of the control scheme to determine when to perform the backwash process 510 in the methods of flowcharts 500, 518 as shown in FIGS. 5A and 5B, respectively. The control scheme of the block diagram 600 includes a first block 602 in which the processor 348 determines whether the filter 200 is saturated (e.g., the first conductive mesh 212 is saturated) such that the filter 200 is no longer filtering out the contaminant particles 406 effectively from the fluid passing through the filter 200. For example, as discussed above one or more sensors may be provided to monitor the efficiency of the filter 200.

In some embodiments, a first particle counter is provided at the first inlet/outlet end 204 of the filter 200 and counts a number of the contaminant particles 406 entering the filter 200, and a second particle counter is provided at the second inlet/outlet end 206 of the filter 200 and counts a number of the contaminant particles 406 exiting the filter 200. For example, if the number of the contaminant particles 406 counted by the first particle counter is equal to the number of the contaminant particles 406 counted by the second particle counter, the processor 348 may determine the filter 200 is saturated and is no longer effectively or efficiently filtering the contaminant particles 406 from the fluid passing through the filter 200. Alternatively, a threshold ratio may be set such that when a ratio between the number of the contaminant particles counted by the first particle counter and the number of contaminant particles counted by the second particle counter (e.g., the number of the contaminant particles 406 counted by second particle counter: the number of contaminant particles 406 counted by first particle counter) is greater than the threshold ratio or is equal to the threshold ratio, the processor 348 may determine that the filter 200 is no longer effectively and efficiently filtering out the contaminant particles 406 from the fluid passing through the filter 200.

In some embodiments, an influent conductivity sensor is provided at the first inlet/outlet end 204 of the filter 200 and determines an influent conductivity of the fluid entering the filter 200, and an effluent conductivity sensor is provided at the second inlet/outlet end 206 of the filter 200 and determines an effluent conductivity of the fluid exiting the filter 200. For example, if the influent conductivity is equal to the effluent conductivity, the processor 348 may determine that the filter 200 is saturated and is no longer effectively or efficiently filtering the contaminant particles 406 from the fluid passing through the filter 200. Alternatively, a threshold ratio may be set such that when a ratio between influent conductivity and the effluent conductivity (e.g., effluent conductivity: influent conductivity) is greater than the threshold ratio or equal to the threshold ratio, the processor 348 may determine that the filter 200 is no longer effectively and efficiently filtering out the contaminant particles 406 from the fluid passing through the filter 200.

When the processor 348 determines that the filter 200 is saturated, the processor 348 sends various control signals in a second block 604 to various components of the system 300 such that the backwash process 510 in the methods of the flowcharts 500, 518 is performed and carried out. Oppositely, when the processor 348 determines that the filter 200 is not yet saturated, the processor 348 continues to allow the filter 200 to continue to filter the fluid passing through the filter 200 in a third block 606.

The control scheme of the block diagram 600 as shown in FIG. 6 may be carried out successively multiple times such that the efficiency and effectiveness of the filter 200 is monitored in real time. This real time monitoring reduces the likelihood of introducing the contaminant particles 406 to a workpiece that is being processed or refined within a FAB manufacturing semiconductor devices or packages.

As set forth within the present disclosure, the filter 200 and the methods of the flowcharts 500, 518 as shown in FIGS. 5A and 5B reduce the likelihood of introducing contaminants to workpieces within a FAB that are being refined and processed to manufacture semiconductor devices or packages. Reducing the likelihood of exposing the workpieces to contaminants results in the yield of usable semiconductor devices and packages manufactured by the FAB being increased as well. The filter 200 may be rejuvenated after becoming saturated with the groups 412, which include at least one of the ions 404 and at least one of the contaminant particles 406, such that the usable lifespan of the filter 200 may be increased, and, as a result, the period of time between replacing the filter 200 is increased as well. By improving the yield of usable semiconductor devices and packages and increasing the usable lifespan of the filter 200 results in decreased operation costs and down time to operate the FAB when manufacturing semiconductor devise and packages with the FAB.

A device may be summarized as including a housing with an inner surface and a cavity delimited by the inner surface, the housing includes: a first end; a second end spaced apart from the first end; a first fluid opening at the first end; and a second fluid opening at the second end; a first conductive mesh in the cavity of the housing; and a second conductive mesh in the cavity of the housing, the second conductive mesh is between the first conductive mesh and the inner surface of the housing.

A system may be summarized as including a pump; a first valve downstream the pump; a second valve downstream the first valve; and a conductive filter between the first valve and the second valve, the conductive filter including: a housing downstream the first valve, the housing including an inner surface, a first fluid opening, and a second fluid opening downstream the first fluid opening and downstream the first valve; a first conductive mesh within the housing; and a second conductive mesh within the housing, the second conductive mesh is between the first conductive mesh and the inner surface of the housing.

The second electrical signal may be oppositely charged relative to the first electrical signal.

The second electrical signal may substantially equal to zero.

The removing the one or more charged particles from the fluid may include attracting the charged particles to the first conductive mesh.

The removing the one or more charged particles from the fluid may include repelling the charged particles from the first conductive mesh.

The removing the one or more charged particles from the fluid passing through the housing may further include applying a third voltage different from a first voltage to a second conductive mesh within the housing and spaced apart from the first conductive mesh within the housing.

A method may be summarized as including removing one or more charged particles from a fluid passing through a housing including applying a first electrical signal to a first conductive mesh within the housing; and removing the one or more charge particles from the housing including switching the first electrical signal being applied to the first conductive mesh within the housing to a second electrical signal by applying the second electrical signal to the first conductive mesh.

A semiconductor manufacturing process may be summarized as including receiving a substrate in a process chamber; and providing a filtered chemical fluid to the processing chamber including: passing a chemical fluid through a filter housing; and removing one or more charged particles from the chemical fluid passing through the filter housing by applying a first electrical signal to a first conductive mesh within the filter housing.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a conductive filter including:
    a housing with an inner surface and a cavity delimited by the inner surface, the housing includes:
    a first end;
    a second end spaced apart from the first end;
    a first fluid opening at the first end;
    a second fluid opening at the second end;
    a first backwash opening at the first end and spaced apart from the first fluid opening;
    a second backwash opening at the second end and spaced apart from the second fluid opening; and
    a center axis;
    a first cylindrical conductive mesh in the cavity of the housing, and the first cylindrical conductive mesh is configured to, in operation, act as a first electrode and a first filter, wherein the first cylindrical conductive mesh is made of a first metal material, and the first cylindrical conductive mesh includes:
        a third end at which the first cylindrical conductive mesh terminates, the third end is in close proximity to the first fluid opening and the first backwash opening;
        a fourth end at which the first cylindrical conductive mesh terminates, the fourth end is opposite to the third end, and the fourth end is in close proximity to the second fluid opening and the second backwash opening;
    a second cylindrical conductive mesh in the cavity of the housing, the second cylindrical conductive mesh is between the first conductive mesh and the inner surface of the housing, the second cylindrical conductive mesh completely and fully surrounds the first cylindrical conductive mesh, and the second cylindrical conductive mesh is configured to, in operation, act as a second electrode and a second filter, wherein the second cylindrical conductive mesh is made of a second metal material, and the second cylindrical conductive mesh includes:
        a fifth end at which the second cylindrical conductive mesh terminates, the fifth end is in close proximity to the first fluid the second fluid opening and the second backwash opening; and
        a sixth end at which the second cylindrical conductive mesh terminates, the sixth end is opposite to the fifth end, and the sixth end is in close proximity to the second fluid opening and the second backwash opening;
    a first volume is defined and completely surrounded by the first cylindrical conductive mesh, the first volume being void;
    a second volume is defined between the first cylindrical conductive mesh and the second cylindrical conductive mesh, the second volume completely spaces apart the first cylindrical conductive mesh from the second cylindrical conductive mesh, and the second volume completely surrounds the first cylindrical conductive mesh, the second volume being void; and
    a third volume is defined between the second cylindrical conductive mesh and the inner surface of the housing, and the third volume completely surrounds the second cylindrical conductive mesh, the third volume being void; and
    wherein the cavity of the housing, the first cylindrical conductive mesh, and the second cylindrical conductive mesh are concentric with the center axis;
a backwash fluid source in fluid communication with the first backwash fluid opening;
a first backwash valve between the backwash fluid source and the first backwash fluid opening;
a second backwash valve downstream from the second backwash opening;
a power supply electrically coupled to the first cylindrical conductive mesh and the second cylindrical conductive mesh;
one or more sensors configured to, in operation, monitor characteristics and qualities of the conductive filter; and
a processing system in electrical communication with the one or more sensors, the first valve, the second valve, the first backwash valve, the second backwash valve, the one or more sensors, and the power supply, and the processing system is configured to, in operation:
    monitor the characteristics and qualities of the conductive filter collected by the one or more sensors;
    display the characteristics and qualities of the conductive filter collected by the one or more sensors;
    when one or more of the characteristics or qualities are compliant with one or more selected thresholds indicating the conductive filter is unsaturated, a filtering process is allowed to continue being performed; and
    when one or more characteristics or qualities are noncompliant with the one or more selected thresholds indicating the conductive filter is saturated, a backwash process to regenerate or rejuvenate the conductive filter is initiated in which respective polarities of the first cylindrical conductive mesh and the second cylindrical conductive mesh are switched relative to each other
    wherein a first fluid flow direction is utilized during the filtering process is in a first direction; and
    wherein a second fluid flow direction is utilized during the backwash process opposite to the first fluid flow direction.

2. The system of claim 1, wherein one of the first backwash opening or the second backwash opening is configured to, in operation, be in fluid communication with a backwash fluid source in fluid communication with at least one of the following of the first backwash opening and the second backwash opening.

3. The system of claim 1, wherein the first cylindrical conductive mesh and the second cylindrical conductive mesh have a mesh size of equal to or less than 74-micrometers.

4. The system of claim 1, wherein the first cylindrical conductive mesh and the second cylindrical conductive mesh have a mesh size equal to or less than 3-micrometers.

5. The system of claim 1, wherein:
the housing has a first diameter that extends from the center axis to the inner surface;
the first cylindrical conductive mesh has a second diameter that extends from the center axis to the first cylindrical conductive mesh, the second diameter is less than the first diameter;
the second cylindrical conductive mesh has a third diameter that extends from the center axis to the second cylindrical conductive mesh, the third diameter is less than the first diameter and is greater than the second diameter.

6. The system of claim 1, wherein the first and second cylindrical conductive meshes include a coated stainless steel mesh.

7. The system of claim 6, wherein the coated stainless steel mesh includes a stainless steel mesh coated with a fluorine based polymer material.

8. The system of claim 1, wherein, in a top-plan view, the first cylindrical conductive mesh has a first circular profile and the second has a second circular profile, and the second circular profile completely surrounds the first circular profile.

9. The system of claim 1, wherein the first cylindrical conductive mesh is spaced apart from the second cylindrical conductive mesh by a distance equal to or greater than 1-centimeter (cm).

10. A system, comprising:
a pump;
a first valve downstream the pump;
a second valve downstream the first valve; and
a conductive filter between the first valve and the second valve, the conductive filter including:
a housing downstream the first valve, the housing including:
a first end;
a second end opposite to the first end;
an inner surface;
a first fluid opening at the first end;
a second fluid opening at the second end, downstream the first fluid opening, and downstream the first valve;
a first backwash opening at the first end and spaced apart from the first fluid opening; and
a second backwash opening at the second end and spaced apart from the second fluid opening, the second backwash opening being downstream the first backwash opening;
a first right cylindrical conductive mesh within the housing, the first right cylindrical conductive mesh has a first diameter that remains consistent along each respective point of the first right cylindrical conductive mesh, wherein the first right cylindrical conductive mesh is configured to, in operation, act as a first electrode and a first filter, and wherein the first right cylindrical conductive mesh is made of a first metal material; and
a second right cylindrical conductive mesh within the housing, the second right cylindrical conductive mesh is between the first right cylindrical conductive mesh and the inner surface of the housing by a volume that extends from the first right cylindrical conductive mesh and the second right cylindrical conductive mesh, the second right cylindrical conductive mesh completely surrounds the first right cylindrical conductive mesh, the second right cylindrical conductive mesh has a second diameter that remains consistent along each respective point of the second right cylindrical conductive mesh, the second diameter is greater than the first diameter, and the second right cylindrical conductive mesh is concentric with the first right cylindrical conductive mesh, wherein the second right cylindrical conductive mesh is configured to, in operation, act as a second electrode and a second filter, and wherein the second right cylindrical conductive mesh is made of a second metal material;
a first backwash valve between the backwash fluid source and at least one of the following of the first backwash opening;
a second backwash valve downstream from the second backwash opening;
a power supply electrically coupled to the first right cylindrical conductive mesh and the second right cylindrical conductive mesh;
one or more sensors configured to, in operation, monitor characteristics and qualities of the conductive filter; and
a processing system in electrical communication with the one or more sensors, the first valve, the second valve, the first backwash valve, the second backwash valve, the one or more sensors, and the power supply, and the processing system is configured to, in operation:
monitor the characteristics and qualities of the conductive filter collected by the one or more sensors;
display the characteristics and qualities of the conductive filter collected by the one or more sensors;
when one or more of the characteristics or qualities are compliant with one or more selected thresholds indicating the conductive filter is unsaturated, a filtering process is allowed to continue being performed; and
when one or more characteristics or qualities are non-compliant with the one or more selected thresholds indicating the conductive filter is saturated, a backwash process to regenerate or rejuvenate the conductive filter is initiated in which respective polarities of the first right cylindrical conductive mesh and the second right cylindrical conductive mesh are switched relative to each other.

11. The system of claim 10, further comprising one or more power supplies in electrical communication with the first right cylindrical conductive mesh and the second right cylindrical conductive mesh.

12. The system of claim 10, further comprising a third valve downstream the conductive filter.

13. The system of claim 12, wherein the conductive filter is between the first valve and the third valve, and the conductive filter is between the second valve and the third valve.

14. A system, comprising:
a pump;

a reservoir tank in fluid communication with the pump;

at least one workpiece processing tool in fluid communication with the reservoir tank;

a first valve downstream the pump;

a second valve downstream the first valve; and a conductive filter between the first valve and the second valve, the conductive filter including:

a cylindrical housing downstream the first valve, the cylindrical housing including:

a first end and a second end opposite to the first end;

an inner surface;

a cavity delimited by the inner surface;

a first fluid opening at the first end and in fluid communication with the cavity;

a second fluid opening at the second end, downstream the first fluid opening, and downstream the first valve and in fluid communication with the cavity;

a center axis;

a first diameter that extends from the center axis to the inner surface of the cylindrical housing;

a first backwash opening proximate the first end, the first backwash opening separate from the first fluid opening, and the first backwash opening being in fluid communication with the cavity; and a second backwash opening proximate the second end, the second backwash opening separate from the second fluid opening, the second backwash opening being in fluid communication with the cavity;

a first cylindrical conductive mesh within the cavity of the cylindrical housing, the first cylindrical conductive mesh being concentric the center axis, the first cylindrical conductive mesh having a second diameter that remains consistent at each respective point along the first cylindrical conductive mesh, the second diameter being less than the first diameter, and the first cylindrical conductive mesh is configured to, in operation during a filtering operation, receive a first electrical signal charging the first conductive mesh with a first charge type; and a second cylindrical conductive mesh within the cavity of the cylindrical housing, the second cylindrical conductive mesh is between the first cylindrical conductive mesh and the inner surface of the cylindrical housing, the second conductive mesh having a third diameter that remains consistent at each respective point along the second cylindrical conductive mesh, the third diameter being less than the first diameter and greater than the second diameter, the second cylindrical conductive mesh completely surrounds the first cylindrical conductive mesh, the second cylindrical conductive mesh is configured to, in operation during the filtering operation, receive a second electrical signal charging the second conductive mesh with a second charge type opposite to the first charge type;

a backwash fluid source in fluid communication with the first backwash opening;

a first backwash valve between the backwash fluid source and at least one of the following of the first backwash opening;

a second backwash valve downstream from the second backwash opening;

a power supply electrically coupled to the first cylindrical conductive mesh and the second cylindrical conductive mesh;

one or more sensors configured to, in operation, monitor characteristics and qualities of the conductive filter; and a processing system in electrical communication with the one or more sensors, the first valve, the second valve, the first backwash valve, the second backwash valve, the one or more sensors, and the power supply, and the processing system is configured to, in operation:

monitor the characteristics and qualities of the conductive filter collected by the one or more sensors;

display the characteristics and qualities of the conductive filter collected by the one or more sensors;

when one or more of the characteristics or qualities are compliant with one or more selected thresholds indicating the conductive filter is unsaturated, a filtering process is allowed to continue being performed; and when one or more characteristics or qualities are non-compliant with the one or more selected thresholds indicating the conductive filter is saturated, a backwash process to regenerate or rejuvenate the conductive filter is initiated in which the second cylindrical conductive mesh is switched from the second charge type to the first charge type.

15. The system of claim 14, wherein the first charge type is a positive charge and the second charge type is a negative charge.

16. The system of claim 14, wherein the first charge type is a negative charge type and the second charge type is a positive charge type.

17. The system of claim 14, further comprising a backwash fluid source in fluid communication with at least one of the following of the first backwash opening and the second backwash opening.

18. The system of claim 14, further comprising a third valve between the reservoir tank and the at least one workpiece processing tool.

19. The system of claim 14, wherein the first cylindrical conductive mesh is spaced apart from the second cylindrical conductive mesh by a distance equal to or greater than 1-centimeter (cm).

20. The system of claim 14, wherein the first cylindrical conductive mesh and the second cylindrical conductive mesh have a mesh size equal to or less than 3-micrometers.

* * * * *